Patented May 23, 1939

2,159,542

UNITED STATES PATENT OFFICE 2,159,542

AZO DYESTUFFS

Carl Apotheker and Max Hartmann, Riehen, and Emil Merz, Binningen, Switzerland, assignors to the firm of Society of Chemical Industry in Basle, Basel, Switzerland No Drawing. Application November 13, 1937, Serial No. 174,488. In Switzerland November 16, 1936

6 Claims. (Cl. 260—165)

This invention relates to the manufacture of azo-dyestuffs from amines of the general formula

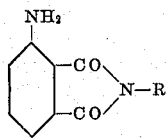

in which R stands for a substituent of the group consisting of alkyl, cycloalkyl, aralkyl and heterocyclic radicals, and in which the benzene nucleus carrying the amino group may have further substituents.

When such amines are diazotized and coupled with various coupling components, dyestuffs are obtained which are characterized by their vividness and their properties of fastness, for example an excellent fastness to light. When sulfonated coupling components are used, there are obtained according to the choice of the components wool or cotton dyestuffs. When unsulfonated coupling components are used there are obtained lacquer dyestuffs or pigment dyestuffs which, when produced on the suitable substrata, dye the latter very valuable tints. Among these insoluble dyestuffs those are of particular value which are produced with the aid of arylides of carboxylic acids capable of coupling, for instance aromatic hydroxy-carboxylic acids, which couple in ortho-position to the hydroxyl group, such as 2,3-hydroxy-naphthoic acid and its substitution products, paracresotinic acids, xylenol-carboxylic acids, chlorocresol-carboxylic acids, hydroxydiphenylaminocarboxylic acids, hydroxycarbazolecarboxylic acids, hydroxynaphthocarbazole-carboxylic acids, 2,3-hydroxyanthracene-carboxylic acid or acids containing reactive -$CH_2$-CO- groups, for instance acetoacetic acid, benzoylacetic acid, terephthaloyl-acetic acid. With such coupling components, which exhibit quite generally an affinity for the fibre, there are obtained yellow to red and brown tints which are characterized by their good properties of fastness.

The new dyestuffs correspond therefore to the general formula

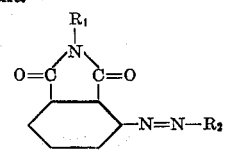

in which $R_1$ stands for a radical of the group consisting of alkyl, cycloalkyl, aralkyl and heterocyclic radicals, and $R_2$ stands for the radical of a coupling component. Among such products those are particularly valuable in which the benzene radical and the radicals $R_1$ and $R_2$ do not contain sulfonic groups or carboxyl groups and therefore are insoluble pigments. Such dyestuffs, produced on substrata, for instance cellulose, dye the same fast tints which are distinguished by valuable properties, for example brilliancy of the shade, fastness to light and the like. Among such products those are again particularly valuable in which arylides of the 2,3-hydroxynaphthoic acid have been used as coupling components. In this manner there are obtained orange to red dyestuffs of excellent fastness to light, particularly if the acyl radical of the arylide of the 2,3-hydroxynaphthoic acid is derived from an amine of the benzene series of the formula

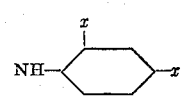

in which one $x$ stands for a member of the group consisting of hydrogen, alkyl and alkoxy, and the other $x$ stands for a member of the group consisting of alkyl and alkoxy, for example ortho-toluidine, ortho-anisidine, meta-xylidine, 1-amino-2:4-dimethoxybenzene, 1-amino-2-methoxy-5-chlorobenzene, 1-amino-2:4-dimethoxy-5-chlorobenzene, 1-amino-2,5-dimethoxybenzene, and the like.

The following examples illustrate the invention, the parts being by weight:

Example 1

19 parts of 3-amino-phthalic acid N-ethylamide are finely powdered and thoroughly suspended in 30 parts of concentrated hydrochloric acid and 30 parts of water. At 10–20° C., there is added in drops a solution of 7 parts of sodium nitrite in a little water. The diazo-solution thus obtained is added by drops to a solution of 30.5 parts of 2-hydroxynaphthalene-6,8-disulfonic acid in 500 parts of water and 35 parts of sodium carbonate. This alkali reaction is soon at an end. The dyestuff is salted out with sodium chloride, filtered with suction and dried at 60–70° C. It is an orange-yellow powder which corresponds to the formula

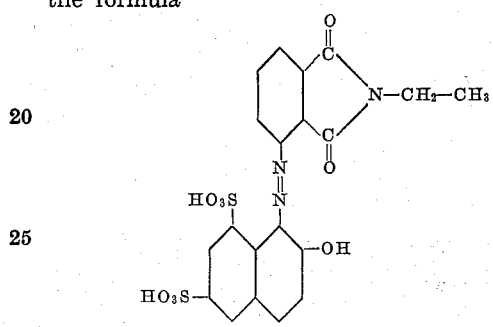

and dyes wool yellow in a sulfuric acid bath. A dyestuff which dyes somewhat redder tints is obtained by using 2-hydroxynaphthalene-3,6-disulfonic acid, while by using 2-amino-8-hydroxynaphthalene-6-sulfonic acid there is obtained a red dyeing dyestuff if the reaction with the diazo-compound occurs in acid medium.

Example 2

27 parts of 3-amino-phthalic acid N-phenylethylamide are finely pulverized and thoroughly suspended in 30 parts of concentrated hydrochloric acid and 30 parts of water. To this mixture there is added by drops at 10–20° C. a solution of 7 parts of sodium nitrite in a little water. The diazo-solution thus obtained is introduced into 50.5 parts of the carbamide of 2-amino-5-hydroxynaphthalene-7-sulfonic acid dissolved in 500 parts of water and 35 parts of sodium carbonate. When the reaction is completed, the dyestuff is salted out with sodium chloride, filtered with suction and dried at 60–70° C. It is a yellow-red powder and dyes cotton orange in a neutral bath.

Example 3

19 parts of 3-amino-phthalic acid N-ethylamide are diazotized as usual and the solution is introduced into one of 29.3 parts of 2,3-hydroxynaphthoic acid-2'-methoxyanilide, 40 parts of sodium hydroxide solution of 30 per cent strength, 15 parts of calcined sodium carbonate and 1000 parts of water. The dyestuff thus produced separates immediately. This scarlet-red precipitate is filtered and dried. This new dyestuff corresponds to the formula

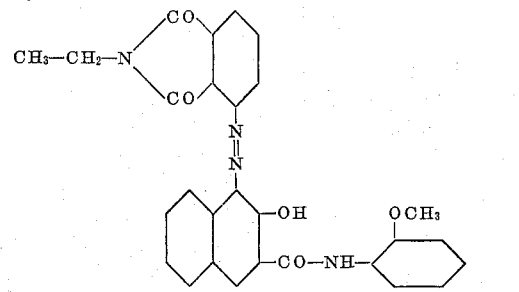

Example 4

Cotton yarn is impregnated with a solution containing per litre 7 grams of 2,3-hydroxynaphthoic acid anilide, 14 cc. of sodium hydroxide solution of 40° Bé., 55 cc. of Turkey red oil, 5 cc. of formaldehyde solution of 40 per cent strength. It is then wrung out, and developed in presence of sulfate of alumina in a diazo-solution, buffered with sodium acetate, and corresponding with 2 grams of 3-amino-phthalic acid N-ethylamide per litre. There is produced a very pure orange tint of very good properties of fastness. The new dyestuff corresponds to the formula

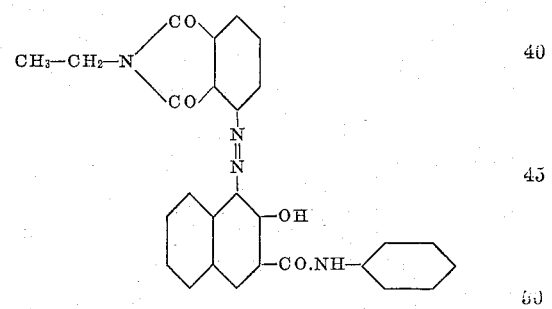

Further dyeings may be obtained as indicated in the following table:

| | Diazo component | 2,3-hydroxynaphthoic acid | Tint on the fiber |
|---|---|---|---|
| 1 | 3-amino-phthalic acid N-ethylimide | -2'-ethoxyanilide | Scarlet. |
| 2 | ......do...... | -3'-chloranilide | Orange. |
| 3 | ......do...... | -4'-methoxyanilide | Scarlet. |
| 4 | ......do...... | -4'-ethoxyanilide | Yellow-brown. |
| 5 | ......do...... | -2'-methyl-5'-chloranilide | Scarlet. |
| 6 | ......do...... | -2'-methoxy-5'-chloranilide | Do. |
| 7 | ......do...... | -2',5'-dimethoxy-anilide | Yellow-brown. |
| 8 | ......do...... | -2'-methyl-4'-methoxyanilide | Do. |
| 9 | ......do...... | -2',4'-dimethoxy-5'-chloranilide | Do. |
| 10 | ......do...... | -2',5'-dimethoxy-4'-chloranilide | Do. |
| 11 | 3-amino-phthalic acid N-benzylimide | -2'-methoxyanilide | Orange. |
| 12 | ......do...... | -2'-methoxy-5'-chloranilide | Yellow-scarlet. |
| 13 | ......do...... | -2',4'-dimethoxy-5'-chloranilide | Yellow-brown. |
| 14 | ......do...... | -2',5'-dimethoxy-anilide | Do. |
| 15 | ......do...... | -2',5'-dimethoxy-4'-chloranilide | Do. |
| 16 | 3-amino-phthalic acid N-cyclohexylimide | -2'-methoxyanilide | Scarlet. |
| 17 | ......do...... | -2'-methoxy-5'-chloranilide | Do. |
| 18 | ......do...... | -2',5'-dimethoxy-anilide | Yellow-brown. |
| 19 | ......do...... | -2'-methyl-4'-methoxyanilide | Red-brown. |
| 20 | ......do...... | -2'-methoxy-5'-chloranilide | Orange. |
| 21 | ......do...... | -2',5'-dimethoxy-4'-chloranilide | Yellow-brown. |
| 22 | ......do...... | -2',4'-dimethoxy-5'-chloranilide | Do. |
| 23 | 3-amino-phthalic acid N-methylimide | -2'-methoxy-5'-chloranilide | Scarlet. |
| 24 | ......do...... | -2'-methyl-5'-chloranilide | Do. |
| 25 | 3-amino-phthalic acid N-i-amylimide | -anilide | Orange. |
| 26 | ......do...... | -1'-naphthylimide | Red. |
| 27 | ......do...... | -2'-naphthylimide | Scarlet. |
| 28 | ......do...... | -4'-chloranilide | Orange. |
| 29 | ......do...... | -4'-ethoxyanilide | Scarlet. |
| 30 | ......do...... | -4'-methoxyanilide | Do. |

|  | Diazo component | 2,3-hydroxynaphthoic acid | Tint on the fiber |
|---|---|---|---|
| 31 | 3-amino-phthalic acid N-i-amylimide | -2'-methoxyanilide | Yellow-scarlet. |
| 32 | ___do___ | -3'-methylanilide | Scarlet. |
| 33 | ___do___ | -2'-methoxy-5'-chloranilide | Do. |
| 34 | ___do___ | -2'-methyl-5'-chloranilide | Scarlet. |
| 35 | ___do___ | -2,5'-dimethoxyanilide | Brown-red. |
| 36 | ___do___ | -2'-methyl-4'-methoxy-anilide | Blue-red. |
| 37 | ___do___ | -2',5'-dimethoxy-5'-chloranilide | Brown-red. |
| 38 | ___do___ | -2',4'-dimethoxy-5'-chloranilide | Yellow-brown. |
| 39 | 3-amino-phthalic acid N-ω-phenylethylimide | -anilide | Orange. |
| 40 | ___do___ | -2'-methylanilide | Scarlet. |
| 41 | ___do___ | -2'-methoxyanilide | Do. |
| 42 | ___do___ | -2'-ethoxyanilide | Orange. |
| 43 | ___do___ | -4'-ethoxyanilide | Yellow-red. |
| 44 | ___do___ | -2'-methoxy-5'-chloranilide | Orange. |
| 45 | ___do___ | -2'-methyl-5'-chloranilide | Scarlet. |
| 46 | ___do___ | -2',5'-dimethoxy-anilide | Yellow-brown. |
| 47 | ___do___ | -2',5'-dimethoxy-4'-chloranilide | Red-brown. |
| 48 | ___do___ | -2'-methyl-4'-methoxyanilide | Brown-red. |
| 49 | ___do___ | -2',4'-dimethoxy-5'-chloranilide | Red-brown. |
| 50 | 3-amino-phthalic acid N-ethylimide | Diacetoacetyl-o:o'-toluidine | Yellow. |
| 51 | 3-amino-phthalic acid N-cyclohexylimide | ___do___ | Do. |
| 52 | 3-amino-phthalic acid N-amylimide | Terephthaloyl-bisacetic acid 2':4'-dimethoxy-5'-chloranilide. | Do. |

The dyestuffs 11, 21, 30, 46, 50 and 52 of the foregoing table correspond with the following formulas:

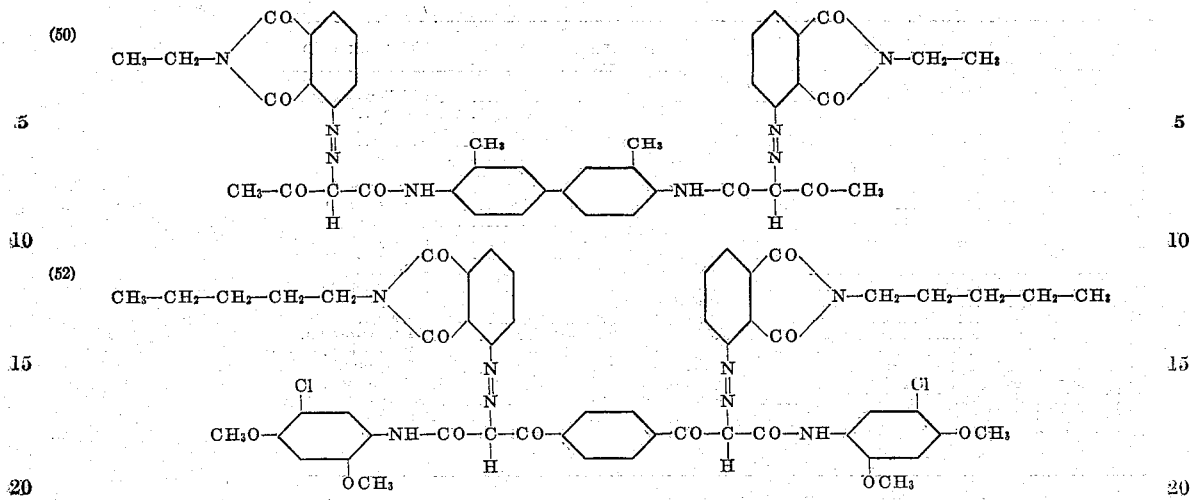

What we claim is:

1. The azo-dyestuffs of the general formula

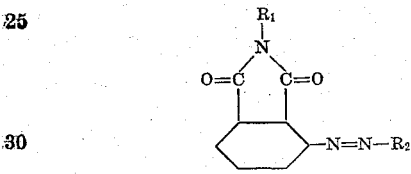

in which $R_1$ stands for a radical of the group consisting of alkyl, cycloalkyl, and aralkyl radicals, and $R_2$ stands for the radical of a coupling component selected from the group consisting of arylides of aromatic carboxylic acids, arylides of acids containing an active methylene group and hydroxynaphthalene sulfonic acids.

2. The azo-dyestuffs of the general formula

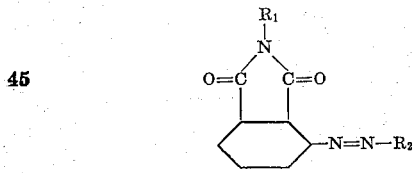

in which $R_1$ stands for a radical of the group consisting of alkyl, cycloalkyl, and aralkyl radicals, and $R_2$ stands for the radical of an arylide of the 2,3-hydroxynaphthoic acid, wherein the aryl nucleus of the arylide stands for a nucleus of the group consisting of benzene and naphthalene nuclei, which dyestuffs are free from carboxyl groups and sulfonic groups.

3. The azo-dyestuffs of the general formula

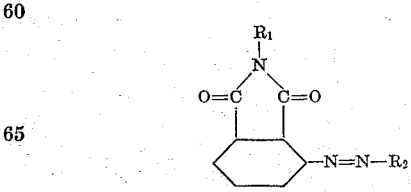

in which $R_1$ stands for a radical of the group consisting of alkyl, cycloalkyl, and aralkyl radicals, and $R_2$ stands for the radical of an arylide of the 2,3-hydroxynaphthoic acid, wherein the aryl nucleus of the arylide stands for a benzene nucleus, which dyestuffs are free from carboxyl groups and sulfonic groups.

4. The azo-dyestuffs of the general formula

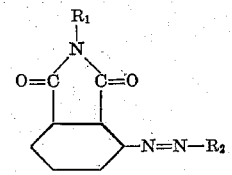

in which $R_1$ stands for a radical of the group consisting of alkyl, cycloalkyl, and aralkyl radicals, and $R_2$ stands for the radical of an arylide of the 2,3-hydroxynaphthoic acid, wherein the aryl nucleus of the arylide is derived from an amine of the benzene series of the following formula

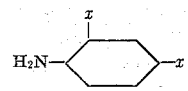

in which one $x$ stands for a member of the group consisting of hydrogen, alkyl, alkoxy, and the other $x$ stands for a member of the group consisting of alkyl and alkoxy, which dyestuffs are free from carboxyl groups and sulfonic groups.

5. The azo-dyestuffs of the general formula

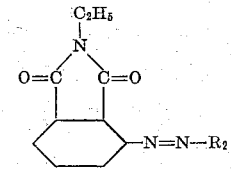

in which $R_2$ stands for the radical of an arylide of the 2,3-hydroxynaphthoic acid, wherein the aryl nucleus of the arylide is derived from an amine of the benzene series of the following formula

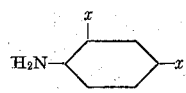

in which one $x$ stands for a member of the group consisting of hydrogen, alkyl, alkoxy, and the other $x$ stands for a member of the group consisting of alkyl and alkoxy, which dyestuffs are free from carboxyl groups and sulfonic groups.

6. The azo-dyestuffs of the general formula

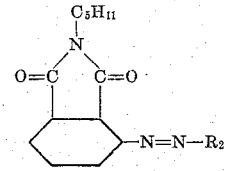

in which R₂ stands for the radical of an arylide of the 2,3-hydroxynaphthoic acid, wherein the aryl nucleus of the arylide is derived from an amine of the benzene series of the following formula

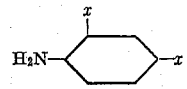

in which one $x$ stands for a member of the group consisting of hydrogen, alkyl, alkoxy, and the other $x$ stands for a member of the group consisting of alkyl and alkoxy, which dyestuffs are free from carboxyl groups and sulfonic groups.

CARL APOTHEKER.
MAX HARTMANN.
EMIL MERZ.